United States Patent
Keimel et al.

(10) Patent No.: US 9,465,160 B2
(45) Date of Patent: Oct. 11, 2016

(54) PLASMONIC INTERFACE AND METHOD OF MANUFACTURING THEREOF

(71) Applicant: General Electric Company, Schenectady, NY (US)

(72) Inventors: Christopher Fred Keimel, Schenectady, NY (US); John Brian Hewgley, Schenectady, NY (US); Juan Jose Becerra, Altamont, NY (US)

(73) Assignee: General Electric Company, Schenectady, NY (US)

( * ) Notice: Subject to any disclaimer, the term of this patent is extended or adjusted under 35 U.S.C. 154(b) by 327 days.

(21) Appl. No.: 13/970,852

(22) Filed: Aug. 20, 2013

(65) Prior Publication Data

US 2015/0055924 A1 Feb. 26, 2015

(51) Int. Cl.
G02B 6/02 (2006.01)
C25D 11/26 (2006.01)
C25D 11/04 (2006.01)
(Continued)

(52) U.S. Cl.
CPC .............. *G02B 6/02* (2013.01); *B32B 37/12* (2013.01); *B32B 37/24* (2013.01); *C25D 11/04* (2013.01); *C25D 11/26* (2013.01); *G02B 6/1226* (2013.01); *B32B 2037/243* (2013.01); *B32B 2255/205* (2013.01); *B32B 2255/28* (2013.01);
(Continued)

(58) Field of Classification Search
CPC ...... G02B 6/02; G02B 6/1226; B32B 37/12; B32B 37/24; B32B 2037/243; B32B 2255/28; B32B 2255/205; B32B 2307/40; B32B 2307/412; B32B 2551/00; C25D 11/04; C25D 11/26

USPC ........... 385/129–132; 205/322, 323; 156/150
See application file for complete search history.

(56) References Cited

U.S. PATENT DOCUMENTS 7,265,845 B2 9/2007 Kochergin
7,706,653 B2 4/2010 Park et al.
(Continued)

FOREIGN PATENT DOCUMENTS

GB 2194785 A 3/1988
JP 2003207667 A 7/2003
(Continued)

OTHER PUBLICATIONS

Worledge et al., "Controlled oxidation of tantalum and aluminium in a radio-frequency-excited glow discharge", Brit. J. Appl. Phys., 1967, vol. 18, pp. 1337-1339.*
(Continued)

*Primary Examiner* — Akm Ullah
*Assistant Examiner* — Michael Mooney
(74) *Attorney, Agent, or Firm* — Ziolkowski Patent Solutions Group, SC; Jean K. Testa

(57) ABSTRACT

A method of manufacturing a layered material stack that includes a plasmonic interface between a plasmonic material and optical waveguide material is disclosed. The method includes providing a substrate layer, disposing a layer of plasmonic material on the substrate layer, depositing a metal constituent of an optical waveguide material directly onto the layer of plasmonic material, and anodizing the metal constituent of the optical waveguide material to form an optically transparent oxide of the metal constituent configured to couple light into the layer of plasmonic material, with the optically transparent oxide of the metal constituent forming an optical waveguide structure.

17 Claims, 2 Drawing Sheets

(51) Int. Cl.
 *B32B 37/12* (2006.01)
 *B32B 37/24* (2006.01)
 *G02B 6/122* (2006.01)

(52) U.S. Cl.
 CPC ...... *B32B2307/40* (2013.01); *B32B 2307/412* (2013.01); *B32B 2551/00* (2013.01)

(56) References Cited

U.S. PATENT DOCUMENTS

| | | | |
|---|---|---|---|
| 8,040,761 | B2 | 10/2011 | Kawamori et al. |
| 8,054,147 | B2 | 11/2011 | Hays et al. |
| 8,260,560 | B2 | 9/2012 | Yoshikawa et al. |
| 2004/0048075 | A1 | 3/2004 | Tominaga et al. |
| 2005/0063644 | A1 | 3/2005 | Park et al. |
| 2006/0169592 | A1* | 8/2006 | Mardilovich .......... C25D 11/02 205/324 |
| 2008/0093744 | A1* | 4/2008 | Wang ..................... C25D 11/04 257/758 |
| 2009/0080295 | A1 | 3/2009 | Kojima |
| 2010/0259826 | A1 | 10/2010 | Ji et al. |
| 2010/0329085 | A1* | 12/2010 | Kawamori ............ G11B 5/3116 369/13.24 |
| 2011/0222190 | A1 | 9/2011 | Hara et al. |
| 2011/0286128 | A1 | 11/2011 | Tsutsumi et al. |
| 2011/0303637 | A1 | 12/2011 | Araki et al. |
| 2012/0113424 | A1 | 5/2012 | Suda et al. |
| 2013/0120752 | A1* | 5/2013 | Lee ......................... G02B 6/02 356/445 |

FOREIGN PATENT DOCUMENTS

| | | | |
|---|---|---|---|
| JP | 2003207667 A | * 7/2003 | ............ G02B 6/122 |
| JP | 2005010025 A | 1/2005 | |
| JP | 2008176209 A | 7/2008 | |

OTHER PUBLICATIONS

Kryder et al., "Heat Assisted Magnetic Recording," Proceedings of the IEEE, vol. 96, No. 11, Nov. 2008, pp. 1810-1835.

Challener et al., "Heat-Assisted Magnetic Recording by a Near-Field Transducer with Efficient optical Energy Transfer," Nature Photonics, 2009, pp. 1-5.

European Search Report and Opinion issued in connection with corresponding EP Application No. 14179835 dated May 8, 2015.

* cited by examiner

PLASMONIC INTERFACE AND METHOD OF MANUFACTURING THEREOF

BACKGROUND OF THE INVENTION

The invention relates generally to plasmonic materials and, more particularly, to a plasmonic interface between a plasmonic material and optical waveguide material and method for providing such an interface.

Plasmonic materials are materials that exploit surface plasmons, which are produced from the interaction of light with the plasmonic material, which according to various designs can be a metal-dielectric metamaterial or suitable metallic material (e.g., gold (Au) or silver (Ag)). Under specific conditions, the incident light couples with the surface plasmons to create self-sustaining, propagating electromagnetic waves known as surface plasmon polaritons (SPPs) or near-field light, which are much shorter in wavelength than the incident light.

One growing application of plasmonic materials is for use in plasmonic induced data storage. In plasmonic induced data storage, the near-field light generated by the plasmonic material—and the intense, localized optical fields of the near-field light—are focused and applied to a diffraction-limited spot over a small region of an optical disk containing metallic nano-structures to achieve high storage densities on the disk. One particular form of plasmonic induced data storage that continues to develop is heat assisted magnetic recording (HAMR), which is a technique that magnetically records data on high-stability media at a high storage density. In HAMR, a laser is used in conjunction with plasmonic materials to produce near-field light that momentarily heats the recording area of a recording medium to reduce its coercivity below that of a magnetic field applied from a recording head mechanism.

One known mechanism for generating near-field light is a near-field light generating device that includes a thin film optical light pipe or waveguide structure coupled to a thin film plasmonic material—with the thin film plasmonic material forming a structure that is commonly referred to as a near-field transducer (NFT). According to one embodiment, the optical light pipe/waveguide structure is formed of a waveguide material in combination with a buffer material—with one possible combination of the materials of the waveguide and the buffer layer being tantalum pentoxide ($Ta_2O_5$) as the material of the waveguide and aluminum oxide ($Al_2O_3$) as the material of the buffer layer. It is recognized, however, that the optical light pipe may be formed only of a waveguide material (e.g., $Ta_2O_5$) without the use of an accompanying buffer layer. Regarding the NFT, the plasmonic material of the NFT may be a noble metal such as Ag or Au.

A general construction of a material stack of a near-field light generating device as described above that includes a waveguide, a buffer layer, and a plasmonic material is shown in FIG. 1. As shown in FIG. 1, in the material stack 1 of the near-field light generating device, the construction is such that a thin film plasmonic material layer (forming an NFT) 2 is disposed on a thin film optical light pipe structure 3, with the thin film optical light pipe structure 3 being adhered to a supporting substrate layer 4 by way of an adhesive 5. The thin film optical light pipe structure 3 is formed of a waveguide layer 6 and a buffer layer 7, with the plasmonic material layer 2 being applied to the buffer layer 6 of the light pipe 3. In such a case, the material stack 1 is manufactured by forming the buffer layer 7 on the top surface of the waveguide layer 6, and forming the plasmonic material layer 2 on the buffer layer 7. It is recognized, however, that in the case of forming the plasmonic material layer 2 of a noble metal such as Ag or Au on the buffer layer 7 of $Al_2O_3$, there occurs the problem that the plasmonic material layer 2 may exfoliate in the process of manufacturing the material stack 1, since noble metals such as Ag and Au are low in strength of adhesion to $Al_2O_3$. To cope with this, an adhesion layer 8 made of metal, such as titanium, may be formed as an interlayer between the buffer layer 7 and the plasmonic material layer 2, with the adhesion layer 8 being deposited to adhere to the buffer layer 7 and promote the adhesion of the plasmonic material layer 2.

While the inclusion of the adhesion layer 8 in the above described material stack 1 of near-field light generating device provides for a strong adhesion between the plasmonic material layer 2 and the buffer layer 7 of the optical light pipe 3, the adhesion layer 8 can have a negative impact on the performance of the near-field light generating device in generating near-field light. That is, it is recognized that localized plasmon generation in the plasmonic material layer 2 and its efficiency in light energy conversion are both a function of the plasmonic material and the ability of applied light to efficiently couple into the plasmonic material. This efficiency in light energy conversion can be negatively affected by the presence of materials that reduce the ability of applied light to efficiently couple into the plasmonic material. With respect to the above described material stack 1, the titanium adhesive layer 8 results in such a loss of efficiency in light energy conversion, since the titanium adhesive layer 8 is applied directly between the optical light pipe 3 and the plasmonic material layer 2, and thus functions as a loss mechanism.

As an alternative method of forming a material stack of a near-field light generating device that includes a waveguide, a buffer layer, and a plasmonic material, it is recognized that a waveguide material could be sputtered onto a plasmonic layer to form the waveguide structure. However, it is recognized that such sputtering of the waveguide material will not provide a waveguide layer(s) that is stoichiometric, and thus a refractive index of the waveguide structure may not provide for optimal efficiency in the conversion of light energy into localized plasmon generation.

Therefore, it would be desirable to provide a material stack for a near-field light generating device that provides improved performance in generating near-field light, with the material stack providing optimal efficiency in the conversion of light energy into localized plasmon generation in the plasmonic material of the material stack. It would further be desirable for the material stack to maintain adequate adhesion between the thin film layers therein while providing this improved efficiency in light energy conversion, such that exfoliation of the plasmonic material from an optical waveguide is prevented.

BRIEF DESCRIPTION OF THE INVENTION

The invention is directed to a plasmonic interface between a plasmonic material and optical waveguide material and method for providing such an interface.

In accordance with one aspect of the invention, a method of manufacturing a layered material stack includes providing a substrate layer, disposing a layer of plasmonic material on the substrate layer, depositing a metal constituent of an optical waveguide material directly onto the layer of plasmonic material, and anodizing the metal constituent of the optical waveguide material to form an optically transparent oxide of the metal constituent configured to couple light into the layer of plasmonic material, the optically transparent oxide of the metal constituent forming an optical waveguide structure.

In accordance with another aspect of the invention, a layered material stack includes a substrate layer, a layer of plasmonic material disposed on the substrate layer, and an anodized optical waveguide structure affixed directly onto the layer of plasmonic material, the anodized optical waveguide structure comprising an optically transparent metal oxide. The optical waveguide structure is in direct atomic contact with the layer of plasmonic material, without an adhesion interlayer being applied between the optical waveguide structure and the layer of plasmonic material.

In accordance with yet another aspect of the invention, a method for fabricating a layered material stack for a near-field light generating device includes providing a substrate layer, applying an adhesion layer to the substrate layer, affixing a thin film plasmonic material to the substrate layer by way of the adhesion layer, and depositing a thin film metal layer directly on the thin film plasmonic material, the thin film metal layer comprising a metal constituent of an optical light pipe material. The method also includes anodizing the thin film metal layer to form an optically transparent oxide of the metal constituent, the optically transparent oxide of the metal constituent forming a thin film optical light pipe on the thin film plasmonic material, with the thin film optical light pipe being in direct contact with the thin film plasmonic material, without an adhesion interlayer being present between the thin film optical light pipe and the thin film plasmonic material.

Various other features and advantages will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION

Embodiments of the invention provide a material stack having plasmonic interface between a plasmonic material and optical waveguide material and method for providing such an interface. The material stack is formed such that the plasmonic material is placed in direct atomic contact with the optical material. Thin film anodization is employed to grow the optical material film(s) directly on the plasmonic material without the need for adhesion interlayers therebetween.

Figure 2:
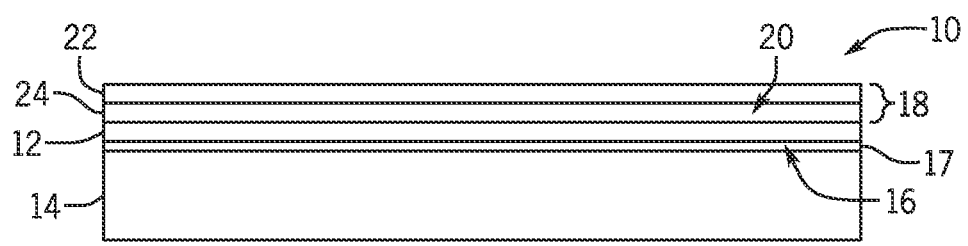
FIG. 2 illustrates a material stack of a near-field light generating device according to an embodiment of the invention.

Referring to FIG. 2, a layered material stack 10 of thin film materials is shown according to an embodiment of the invention. According to one embodiment of the invention, it is envisioned that the material stack 10 is integrated as part of a near-field light generating device that is employed for performing a plasmonic induced data storage operation (e.g., HAMR). It is recognized, however, that material stack 10 may have applications outside that of plasmonic induced data storage applications.

As shown in FIG. 2, material stack 10 includes a thin film layer of plasmonic material 12 that is disposed on a substrate layer 14, with a first surface 16 of the plasmonic material layer 12 facing the substrate layer 14 and being secured thereto by way of an adhesive layer 17. The thin film plasmonic layer 12 is formed of a plasmonic material such as gold (Au) or silver (Ag), or potentially of a metal-dielectric metamaterial, while the substrate layer 14 may be composed of any of a number of suitable electrically insulative or conductive materials that are capable of providing structural support during a build-up of the material stack 10. According to one embodiment, the thin film plasmonic layer 12 may be form part of a near-field transducer (NFT).

Also included in the material stack is a thin film optical waveguide structure 18 (i.e., "light pipe structure") that is disposed on a second surface 20 of the thin film plasmonic layer 12. According to embodiments, the waveguide structure 18 is formed of one or more optical waveguide materials. In one embodiment, the waveguide structure 18 is formed of two optical waveguide materials, including what are generally referred to here as a waveguide layer 22 and a buffer layer 24—with the buffer layer 24 comprising a waveguide material having a refractive index lower than that of the waveguide material of waveguide layer 22. The buffer layer 24 is disposed on the thin film plasmonic layer 12 with the waveguide layer 22 being applied on the buffer layer 24. In an exemplary embodiment, the waveguide layer 22 may be formed of tantalum pentoxide ($Ta_2O_5$), while the buffer layer 24 may be formed of aluminum oxide ($Al_2O_3$). The waveguide layer 22 and buffer layer 24 are formed as dense stoichiometric films with a refractive index that closely resembles the refractive index of crystalline $Ta_2O_5$ and $Al_2O_3$.

According to an exemplary embodiment, the waveguide structure 18 is placed in direct atomic contact with the thin film plasmonic layer 12 without the presence of any adhesion interlayers therebetween. That is, the waveguide structure 18 is grown directly on the thin film plasmonic layer 12 by way of a thin film anodization process, such that no adhesion interlayers are required for adhering the layers 12, 18 together therebetween. By placing the waveguide structure 18 in direct atomic contact with the thin film plasmonic layer 12, light that is applied to the material stack 10 can be efficiently coupled into the thin film plasmonic layer 12 so as to minimize a loss of efficiency in light energy conversion in the plasmonic material of layer 12.

Figure 1:
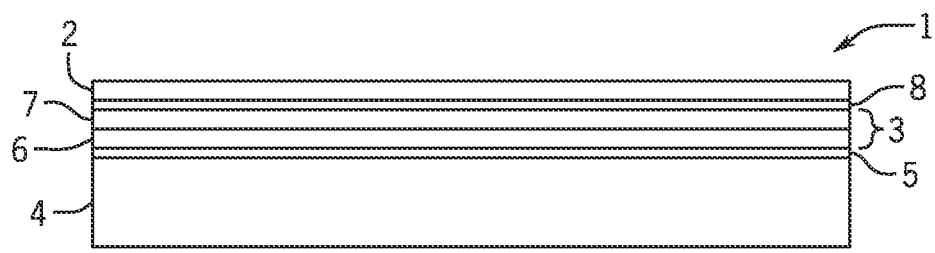
FIG. 1 illustrates a prior art material stack-up of a near-field light generating device.
Figure 3:
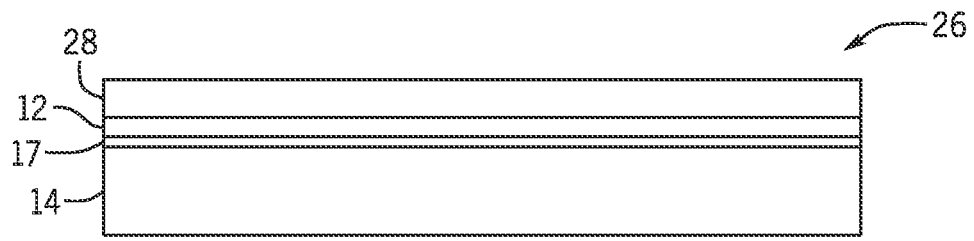
FIG. 3 illustrates a material stack of a near-field light generating device according to another embodiment of the invention.

Referring now to FIG. 3, a material stack 26 of thin film materials is shown according to another embodiment of the invention. The material stack 26 is similar to the material stack 10 of FIG. 1, and thus like numbers are used to indicate identical elements. However, in material stack 26, a thin film optical waveguide structure 28 (i.e., "light pipe structure") is provided that is formed of only of a single waveguide material (e.g., $Ta_2O_5$) without the use of an accompanying buffer material.

Figure 4:
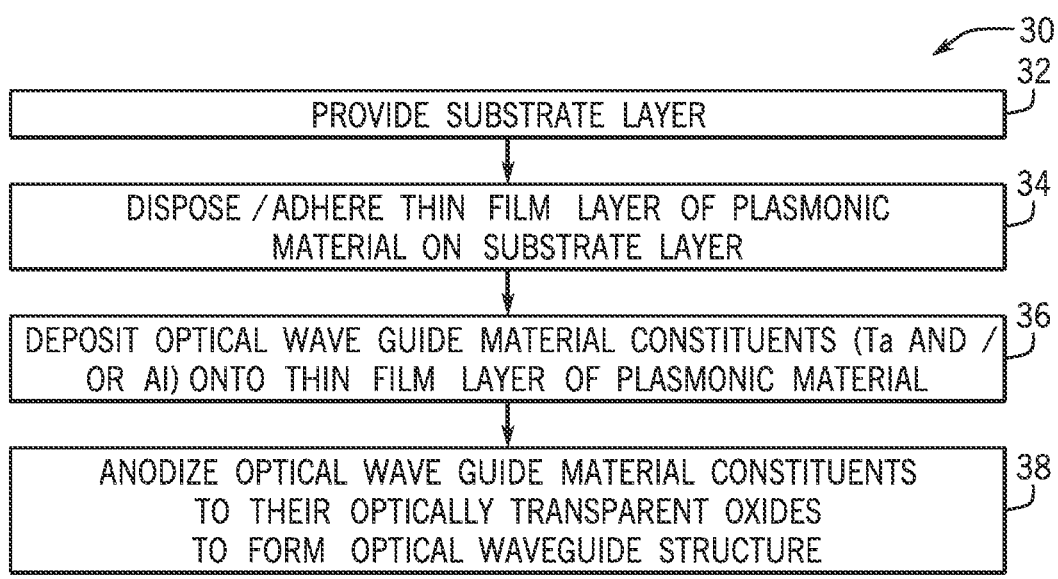
FIG. 4 illustrates a build-up technique for the material stack of FIGS. 2 and 3 according to an embodiment of the invention.

Referring now to FIG. 4, and with continued reference back to FIG. 2, a technique 30 for performing a build-up of a material stack 10, such as could be used a near-field light generating device, is shown according to an embodiment of the invention. The technique 30 begins at STEP 32 by providing a substrate layer 14 that is composed of any of a number of suitable electrically insulative or conductive materials that are capable of providing structural support for the build-up process. A thin film layer of plasmonic material 12, such as gold or silver for example, is then disposed and adhered onto substrate layer 14 at STEP 34, with an adhesive layer or material 17 being applied between the thin film plasmonic layer 12 and the substrate layer 14 to secure the layers together.

Upon securing of the thin film plasmonic layer 12 to the substrate layer 14, the technique 30 continues by depositing the thin film optical waveguide structure 18 on the thin film plasmonic layer 12 at STEP 36. More specifically, constituents of the wave guide materials are deposited on the thin film plasmonic layer 12. Thus, according to one embodiment, where the waveguide structure 18 includes a waveguide layer 22 formed of tantalum pentoxide (Ta2O5) and a buffer layer 24 formed of aluminum oxide ($Al_2O_3$), tantalum (Ta) and aluminum (Al) are deposited on the thin film plasmonic layer 12 at STEP 36. The tantalum and aluminum adhere well to the plasmonic material (i.e., gold/silver) of thin film plasmonic layer 12, and thus no separate adhesion interlay is necessary for adhering the waveguide layer 22 and buffer layer 24 to the film plasmonic layer 12.

While the tantalum and aluminum constituents of the wave guide materials adhere well to the thin film plasmonic layer 12, it is recognized that they are not optically transparent in their metallic form. As such, the tantalum and aluminum are converted to their optically transparent oxides through an anodization process that is performed at STEP 38. In performing the anodization of the tantalum and aluminum constituents of the waveguide layer 22 and buffer layer 24, the electrically conductive thin film plasmonic layer 12 is used as an electrode in the anodization to supply current to the layers 22, 24. In one embodiment, where the substrate layer 14 is formed from an electrically insulating material, current is provided directly to the thin film plasmonic layer 12. In another embodiment, where the substrate layer 14 is formed from an electrically conducting material, current is provided through the substrate layer 14 to thin film plasmonic layer 12.

As a result of the anodization process at STEP 38, the waveguide structure 18 is completely anodized to the thin film plasmonic layer 12 (i.e., is in direct atomic contact with the thin film plasmonic layer 12), such that no interfacial adhesion layers are present at the interface of the waveguide structure 18 and thin film plasmonic layer 12 to act as a loss mechanism. The anodization process at STEP 38 produces a waveguide structure 18 in which a $Ta_2O_5$ waveguide layer 22 and an $Al_2O_3$ buffer layer 24 are formed as dense stoichiometric films with a refractive index that closely resembles the refractive index of crystalline $Ta_2O_5$ and $Al_2O_3$. The stoichiometric waveguide layers 22, 24 of waveguide structure 18 enable light that is applied to the material stack 10 to be efficiently coupled into the thin film plasmonic layer 12 so as to minimize a loss of efficiency in light energy conversion in the plasmonic material of layer 12.

Beneficially, embodiments of the invention thus provide a material stack having a plasmonic interface between a plasmonic material and optical waveguide material that is free of an adhesive interlayer that can contribute to efficiency degradation. The material stack is formed using a technique/process that inverts the typical process order by which such a material stack is usually formed and—in doing so—enables the interface between the optical waveguide material and the plasmonic material to be free of such adhesion layers. In forming the material stack, an optical waveguide structure is anodized directly onto a plasmonic material supported by a substrate layer, with constituents of the wave guide materials (Ta and/or Al) being deposited on the plasmonic material and subsequently converted to their optically transparent oxides through anodization—with the plasmonic material being used as an electrode in the anodization. The waveguide structure is thus formed as a dense stoichiometric film having a refractive index that closely resembles the refractive index of crystalline $Ta_2O_5$ and $Al_2O_3$ so as to enable light that is applied to the material stack to be efficiently coupled into the plasmonic material so as to minimize a loss of efficiency in light energy conversion material stack. The anodized waveguide layers can be detected and determined different from other deposition techniques that could deposit similar quality waveguide films, such as sputtering, as the anodized film is denser than sputtered films.

Therefore, according to one embodiment of the invention, a method of manufacturing a layered material stack includes providing a substrate layer, disposing a layer of plasmonic material on the substrate layer, depositing a metal constituent of an optical waveguide material directly onto the layer of plasmonic material, and anodizing the metal constituent of the optical waveguide material to form an optically transparent oxide of the metal constituent configured to couple light into the layer of plasmonic material, the optically transparent oxide of the metal constituent forming an optical waveguide structure.

According to another embodiment of the invention, a layered material stack includes a substrate layer, a layer of plasmonic material disposed on the substrate layer, and an anodized optical waveguide structure affixed directly onto the layer of plasmonic material, the anodized optical waveguide structure comprising an optically transparent metal oxide. The optical waveguide structure is in direct atomic contact with the layer of plasmonic material, without an adhesion interlayer being applied between the optical waveguide structure and the layer of plasmonic material.

According to yet another embodiment of the invention, a method for fabricating a layered material stack for a near-field light generating device includes providing a substrate layer, applying an adhesion layer to the substrate layer, affixing a thin film plasmonic material to the substrate layer by way of the adhesion layer, and depositing a thin film metal layer directly on the thin film plasmonic material, the thin film metal layer comprising a metal constituent of an optical light pipe material. The method also includes anodizing the thin film metal layer to form an optically transparent oxide of the metal constituent, the optically transparent oxide of the metal constituent forming a thin film optical light pipe on the thin film plasmonic material, with the thin film optical light pipe being in direct contact with the thin film plasmonic material, without an adhesion interlayer being present between the thin film optical light pipe and the thin film plasmonic material.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of manufacturing a layered material stack comprising:

providing a substrate layer;

disposing a layer of plasmonic material on the substrate layer;

depositing a metal constituent of an optical waveguide material directly onto the layer of plasmonic material; and anodizing the metal constituent of the optical waveguide material to form an optically transparent oxide of the metal constituent configured to couple light into the layer of plasmonic material, the optically transparent oxide of the metal constituent forming an optical waveguide structure;

wherein anodizing the metal constituent of the optical waveguide material comprises applying an electric current to the metal constituent of the optical waveguide material through the layer of plasmonic material, the layer of plasmonic material functioning as an electrode for performing the anodization.

2. The method of claim 1 wherein depositing a metal constituent of an optical waveguide material comprises:

depositing a metal constituent of a first optical waveguide material directly onto the layer of plasmonic material; and depositing a metal constituent of a second optical waveguide material directly onto the metal constituent of the first optical waveguide material;

wherein the optically transparent oxide of the metal constituent of the first optical waveguide material has a refractive index lower than that of an optically transparent oxide of the metal constituent of the second optical waveguide material.

3. The method of claim 2 wherein the metal constituent of the first optical waveguide material comprises aluminum and the metal constituent of the second optical waveguide material comprises tantalum.

4. The method of claim 3 wherein anodizing the metal constituent of the optical waveguide material comprises anodizing the aluminum and the tantalum to form aluminum oxide ($Al_2O_3$) and tantalum pentoxide ($Ta_2O_5$).

5. The method of claim 1 wherein the layer of plasmonic material comprises one of gold and silver.

6. The method of claim 1 wherein the optical waveguide structure comprises a stoichiometric film.

7. The method of claim 1 wherein the optical waveguide structure is in direct atomic contact with the layer of plasmonic material, without an adhesion interlayer being present between the optical waveguide structure and the layer of plasmonic material.

8. The method of claim 1 further comprising applying an adhesion layer between the substrate layer and the layer of plasmonic material to adhere the substrate layer to the layer of plasmonic material.

9. The method of claim 1 wherein the layered material stack is configured for use in a near-field light generating device.

10. A layered material stack comprising:

substrate layer;

a layer of plasmonic material disposed on the substrate layer; and an anodized optical waveguide structure affixed directly onto the layer of plasmonic material, the anodized optical waveguide structure comprising an optically transparent metal oxide;

wherein the optical waveguide structure is in direct atomic contact with the layer of plasmonic material, without an adhesion interlayer being applied between the optical waveguide structure and the layer of plasmonic material; and wherein the optical waveguide structure comprises:

a first optical waveguide material deposited directly onto the layer of plasmonic material, the first optical waveguide material comprising aluminum oxide ($Al_2O_3$); and a second optical waveguide material deposited directly onto the first optical waveguide material, the second optical waveguide material comprising tantalum pentoxide ($Ta_2O_5$);

wherein the at $Al_2O_3$ and $Ta_2O_5$ are deposited as an aluminum and tantalum constituent of the respective $Al_2O_3$ and $Ta_2O_5$, prior to an anodization thereof that forms the $Al_2O_3$ and $Ta_2O_5$.

11. The layered material stack of claim 10 wherein the layer of plasmonic material comprises one of gold and silver.

12. The layered material stack of claim 10 wherein the optical waveguide structure comprises a stoichiometric film.

13. The layered material stack of claim 10 wherein the layered material stack is integrated into a near-field light generating device.

14. A method for fabricating a layered material stack for a near-field light generating device comprising:

providing a substrate layer;

applying an adhesion layer to the substrate layer;

affixing a thin film plasmonic material to the substrate layer by way of the adhesion layer;

depositing a thin film metal layer directly on the thin film plasmonic material, the thin film metal layer comprising a metal constituent of an optical light pipe material; and anodizing the thin film metal layer to form an optically transparent oxide of the metal constituent, the optically transparent oxide of the metal constituent forming a thin film optical light pipe on the thin film plasmonic material;

wherein anodizing the thin film metal layer comprises applying an electric current to the thin film metal layer by way of the thin film plasmonic material, the thin film plasmonic material functioning as an electrode for performing the anodization; and wherein the thin film optical light pipe is in direct contact with the thin film plasmonic material, without an adhesion interlayer being present between the thin film optical light pipe and the thin film plasmonic material.

15. The method of claim 14 wherein depositing the thin film metal layer comprises applying at least one of a thin film metal constituent of a waveguide layer and a thin film metal constituent of a buffer layer.

16. The method of claim 15 wherein the thin film metal constituent of the waveguide layer comprises a thin film tantalum layer and the thin film metal constituent of the buffer layer comprises a thin film aluminum layer, with the at least one of the thin film tantalum layer and the thin film aluminum layer being anodized to form at least one of tantalum pentoxide ($Ta_2O_5$) and aluminum oxide ($Al_2O_3$).

17. The method of claim 14 wherein anodizing the thin film metal layer forms a stoichiometric thin film optical light pipe.

* * * * *